(12) United States Patent
Bueche, Jr.

(10) Patent No.: US 7,620,604 B1
(45) Date of Patent: Nov. 17, 2009

(54) SYSTEMS AND METHODS OF CHECK RE-PRESENTMENT DETERRENT

(75) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/202,515

(22) Filed: Sep. 2, 2008

(51) Int. Cl.
*G06Q 40/00* (2006.01)
(52) U.S. Cl. ...................................... 705/45
(58) Field of Classification Search ............... 705/1–45; 283/58; 462/81; 235/379, 380
See application file for complete search history.

(56) References Cited

U.S. PATENT DOCUMENTS

| | | | | |
|---|---|---|---|---|
| 4,002,356 | A * | 1/1977 | Weidmann | 462/81 |
| 5,924,737 | A * | 7/1999 | Schrupp | 283/58 |
| 7,386,511 | B2 * | 6/2008 | Buchanan et al. | 705/45 |
| 2005/0097046 | A1 * | 5/2005 | Singfield | 705/42 |
| 2005/0182710 | A1 * | 8/2005 | Andersson et al. | 705/39 |
| 2005/0267843 | A1 | 12/2005 | Acharya et al. | |
| 2007/0156438 | A1 * | 7/2007 | Popadic et al. | 705/1 |
| 2007/0251992 | A1 | 11/2007 | Sharma et al. | |

OTHER PUBLICATIONS

Electronic Billing Problem: The E-check is in the mail-American Banker-v168, n 95, 91. May 19, 2003.*
Matthews, Deborah, "Advanced Technology Makes Remote Deposit Capture Less Risky", Indiana Bankers Association, Apr. 2008, 2 pgs.

\* cited by examiner

*Primary Examiner*—Mary Cheung
*Assistant Examiner*—Tien C Nguyen
(74) *Attorney, Agent, or Firm*—Chadbourne & Parke LLP; Walter G. Hanchuk (57) ABSTRACT

A user or a device may separate a check into two or more portions prior to generating a digital image of the check for remote deposit of the check. The user or a device may separate the check by cutting or tearing the check. After separating the check into the portions, the user may generate a digital image of the portions of the check using a scanner for example. The digital image may be transmitted to an institution for deposit of the check. The institution may retrieve the images of the portions of the check and generate an image of the check based on the portions, by combining the images of the portions for example. The image of the check that may be generated based on the images of the portions may be processed for deposit.

21 Claims, 6 Drawing Sheets

SYSTEMS AND METHODS OF CHECK RE-PRESENTMENT DETERRENT

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/202,749, and U.S. patent application Ser. No. 12/202,781, each filed on even date and each entitled "Systems And Methods Of Check Re-Presentment Deterrent."

BACKGROUND

Currently, a user may deposit a check in a financial services institution either electronically using scanning and imaging techniques or physically by presenting the check at the financial services institution. Fraud occurs when a user presents the same check twice for deposit (e.g., once electronically and once physically, twice electronically, etc.). This may be referred to as check re-presentment.

Conventional techniques used to detect a re-presented or twice-deposited check rely on matching a deposit amount entered by the user when electronically depositing a check and a deposit amount obtained through character recognition technologies for a physically deposited check. Additional techniques compare magnetic ink character recognition (MICR) lines and/or account numbers. It is difficult to detect a check that is re-presented by a user. Such fraud may present a liability for the financial services institution.

SUMMARY

A user or a device may separate a check into two or more portions prior to generating a digital image of the check for remote deposit of the check. The user or a device may separate the check by cutting or tearing the check. After separating the check into the portions, the user may generate a digital image of the portions of the check using a scanner for example. The digital image may be transmitted to an institution for deposit of the check. The institution may retrieve the images of the portions of the check and generate an image of the check based on the portions, by combining the images of the portions for example. The image of the check that may be generated based on the images of the portions may be processed for deposit.

In an implementation, rather than combining the images of the portions to generate an image of the check, the institution may insert retrieved financial information from the portions into a check template for subsequent processing. In such an implementation, the portions of the images, though provided to the institution, are not combined by the institution.

In an implementation, rather than separating the check into two or more portions, the user may punch one or more holes or other marks in the check. The user may generate a digital image of the check having the hole(s) or mark(s) and transmit the digital image to an institution for deposit of the check. The institution may identify the hole(s) or mark(s) and process the check for deposit.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
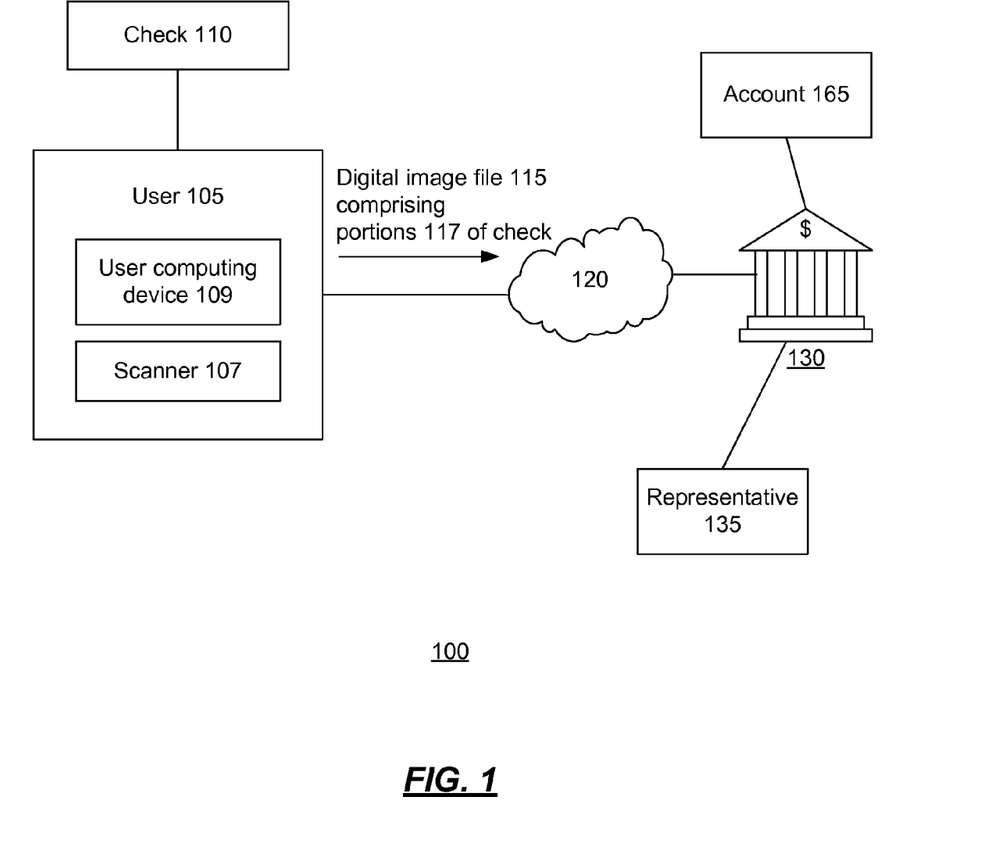
FIG. 1 is a block diagram of an implementation of a system in which example embodiments and aspects may be implemented.

FIG. 1 is a block diagram of an implementation of a system in which example embodiments and aspects may be implemented. The system 100 may include a user 105 and an institution 130, which may be any type of entity capable of processing checks and/or providing funds associated with checks. For example, the institution 130 may be a financial services institution such as a retail bank, an investment bank, an investment company, a regional branch of the Federal Reserve, a clearinghouse bank and/or a correspondent bank. A representative 135 of the institution 130 may provide assistance as described further herein.

The user 105 may be an individual or entity who owns an account 165 that may be held at the institution 130. The account 165 may be any type of account for depositing funds, such as a savings account, a checking account, a brokerage account, and the like. Although only one account 165 is shown, it is contemplated that the user 105 may have any number of accounts held at the institution 130. The user 105 may deposit a check 110 in the account 165 at the institution 130 either electronically or physically. The institution 130 may process and/or clear the check 110.

The user 105 may communicate with the institution 130 by way of a communications network 120 such as an intranet, the Internet, a local area network (LAN), a wide area network (WAN), a public switched telephone network (PSTN), a cellular network, a voice over Internet protocol (VoIP) network, and the like. The user 105 may also communicate with the institution 130 by phone, email, instant messaging, text messaging, facsimile, postal mail, and the like.

As described further herein, the user 105 may remotely electronically deposit the check 110 at the institution 130. It is noted that although examples and implementations described herein may refer to a check, the techniques and systems described herein are contemplated for, and may be used for, deposit of any negotiable instrument, such as a money order, a cashier's check, a check guaranteed by a bank, or the like.

The user 105 may access the institution 130 by opening a communication pathway via the communications network 120 using a user computing device 109. There may be several ways in which the communication pathway may be established, including, but not limited to, an Internet connection via a website of the institution 130. The user 105 may access the website and log into the website using credentials, such as, but not limited to, a username and a password.

The user 105 may use a scanner 107 to generate a digital image of the check 110. The digital image may be used to create a digital image file 115 that may be sent to the institution 130 and used by the institution 130 to process a deposit of the check 110. In an implementation, the digital image file 115 may be augmented by secondary data which may be information relating to the deposit of the check 110, such as an account number and a deposit amount, for example.

In an implementation, the user 105 may separate the check 110 into two or more portions 117 prior to generating a digital image of the check 110 for remote electronic deposit of the check 110. The user 105 may separate the check 110 by cutting or tearing the check 110, for example. In an implementation, the check 110 may be cut or torn along the longitudinal axis. The check 110 may be cut or torn so as to avoid or otherwise not affect the magnetic ink character recognition (MICR) number (e.g., the MICR number will be completely on one portion and a cut or tear will not be made through the MICR number). In an implementation, a device may receive the check 110 and may perform the separating (e.g., by cutting or tearing) pursuant to receiving instructions from the user 105 or the user computing device 109. Such a device may be integrated into the user computing device 109, the scanner 107, or may be separate therefrom.

After separating the check 110 into two or more portions 117, the user 105 may generate a digital image of the portions 117, using the scanner 107 for example. The portions 117 of the check 110 may be positioned on the scanner 107 with space left between the portions 117. For example, after endorsing the check 110 and separating the check 110 into portions 117, the user 105 may use a device such as the scanner 107 and/or the user computing device 109 for example, to convert the portions 117 of the check 110 into a digital image file 115 by making a digital image of the front sides and/or back sides of the portions 117 of the check 110 and storing the digital image(s) in a digital image file 115.

The digital image of the portions 117 may be transmitted to the institution 130 as a digital image file 115. The user 105 may send the digital image file 115 and any secondary data to the institution 130 along with a request to deposit the check 110 into an account, such as the account 165. The institution 130 may process the deposit request according to the digital image file 115 and any secondary data. Thus, as described further herein, the institution 130 may process the digital image file 115 comprising the images of the portions 117 of the check 110 for deposit.

The institution 130 may retrieve the images of the portions 117 of the check 110 from the digital image file 115 and generate an image of the check 110 based on the portions 117, by combining the images of the portions 117 to create an image of the check 110. The image of the check 110 that may be generated based on the images of the portions 117 may be processed for deposit. Any image processing technology may be used to retrieve the images of the portions 117 of the check 110 from the digital image file 115 and combine the portions 117 into an image of the check 110 that may be processed for deposit. In an implementation, certain points or features (e.g., MICR number, "$" sign, signature line, courtesy amount line, legal amount line, etc.) of the check 110 may be identified and used in lining up or otherwise arranging the portions 117 of the check 110 as they are combined into an image. It is contemplated that any points, coordinates, features, or regions of interest on a negotiable instrument may be used with the techniques described herein. Alternatively or additionally, edge detection may be used to identify the edges of the portions 117 and align the portions 117 for combination into an image of the check 110. Any known edge detection technique may be used.

Upon receipt and processing of the digital image file 115 and approval of the check generated therefrom, the institution 130 may credit the funds of the check 110 to the account 165. It will be appreciated that the examples herein are for purposes of illustration and explanation only, and that an embodiment is not limited to such examples.

In an implementation, the user 105 may attach the digital image file 115 to an email and send the digital image file 115 to the institution 130 using the same device used to make the digital image of the portions 117 of the check 110 and/or convert the portions 117 of the check 110 into the digital image file 115, or another computing device. However, any technique for sending a digital image file 115 to the institution 130 may be used, such as providing a digital image file 115 from storage to a website associated with the institution 130.

The user computing device 109 may be integral with the device used to make the digital image and/or the digital image file 115 or separate from the device used to make the digital image and/or the digital image file 115. An example user computing device 109 is described with respect to FIG. 6. It is contemplated that any device that is capable of generating a digital image may be used to make a digital image of the portions 117 of the check 110 which may be sent to the institution 130 as a digital image file 115. Additional devices that may be used in the generation and/or transmission of a digital image file 115 include a digital camera, a photocopier, a fax machine, and the like, for example.

The institution 130 may receive a digital image file 115 representing the portions 117 of the check 110 and may use any known image processing software or other application(s) to obtain the relevant data of the check 110 from the digital image file 115. The institution 130 may determine whether the financial information associated with the check 110 may be valid.

For example, the institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 115 from the user 105.

The electronic devices may receive the digital image file 115 and may perform an initial analysis on the quality of the image of the portions 117 of the check 110 in the digital image file 115, the readability of the data contained therein, or the like. For example, the electronic devices may determine whether the portions 117 may be retrieved and combined and whether the amount payable and other information may be readable such that it may be obtained and processed by the institution 130 to credit the account 165 associated with the user 105.

Because the check 110 is separated into two or more portions 117 by the user 105, it is more difficult for the user 105 to re-present the check 110 for deposit. Also, the institution 130 may more easily detect a re-presentment. Thus, the user 105 may be deterred from re-presenting the check 110. Although an institution may take a check that is separated into multiple portions, it may become questionable and initiate a warning to the institution to more carefully scrutinize the check and the deposit. This may also act as a deterrent to re-presentment. In an implementation, the check 110 may be considered to be "destroyed" before being scanned by the user 105 and image processing may be used by the institution 130 to combine the portions 117 of the check 110 for subsequent processing and deposit.

Figure 2:
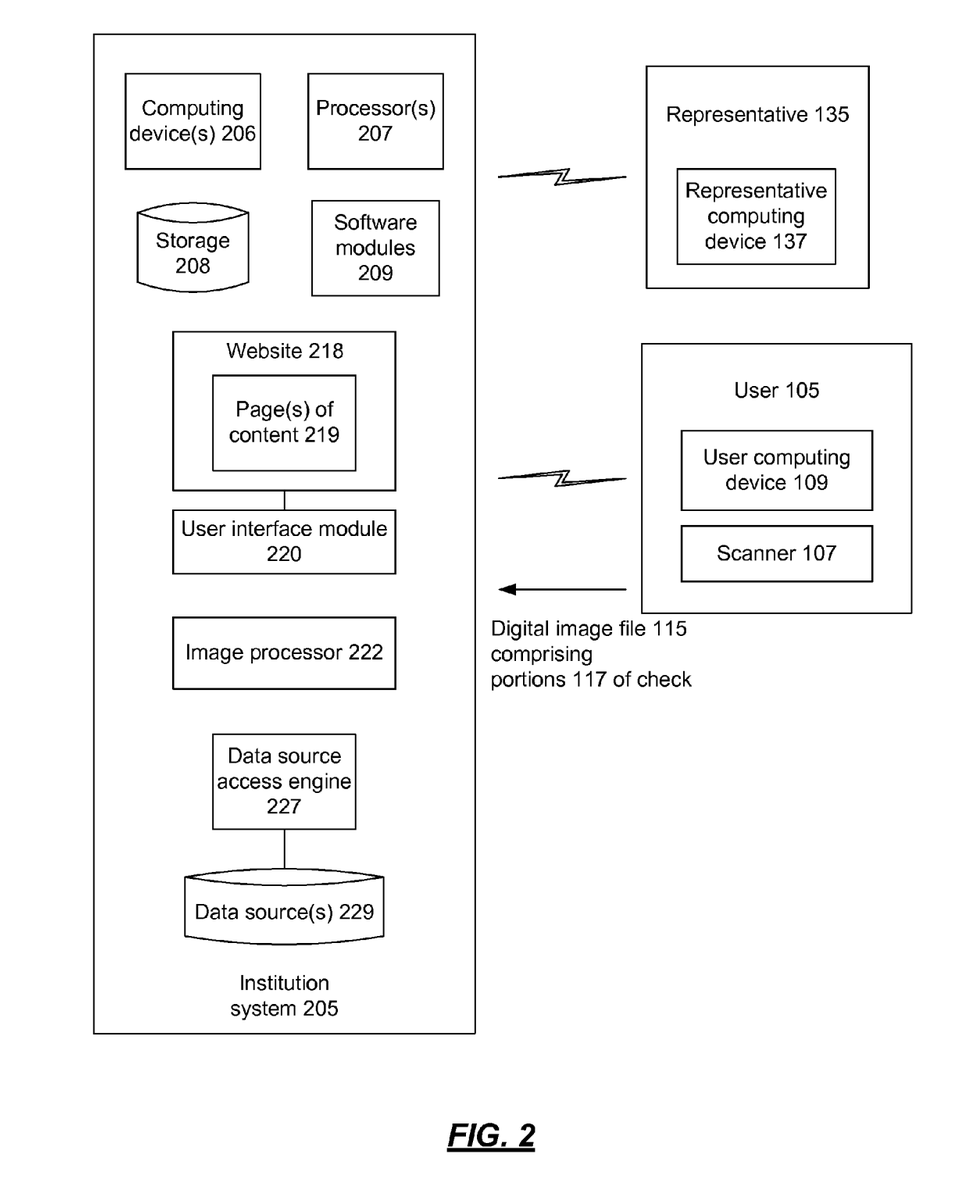
FIG. 2 is a block diagram of an implementation of a system that may be used to deter check re-presentment.

FIG. 2 is a block diagram of an implementation of a system that may be used to deter check re-presentment. An institution system 205 may be associated with the institution 130 and may include a user interface module 220, an image processor 222, and a data source access engine 227. The user interface module 220 may generate and format one or more pages of content 219 as a unified graphical presentation that may be provided to the user computing device 109 or a representative computing device 137. In an implementation, the page(s) of content 219 may be provided to the user computing device 109 and/or the representative computing device 137 via a secure website 218 associated with the institution system 205.

In an implementation, the institution system 205 may use the image processor 222 to process the digital image file 115 comprising the portions 117 of the check 110 received from the user 105 and to generate a digital image (also referred to herein as an image) of the check 110 that may be used by the institution 130 in the processing and/or clearance of the check 110. The image processor 222 may process multiple frames of the image if the image is comprised of multiple frames.

For example, after receiving the digital image file 115 of the check 110, the image processor 222 may retrieve the images of the portions 117 of the check 110 and generate an image of the check 110 by identifying and isolating the portions 117 and combining the portions 117 into an image that may be processed for deposit. The image processor 222 may use any known image processing software or other application(s) to obtain the portions 117 and any relevant data of the check 110 from the digital image file 115.

The image processor 222 has access to data, files, and documents pertaining to the user 105 as well as any other data, files, and documents that are internal or external to the institution system 205 that may be useful in processing the digital image file 115 and/or the data contained therein.

The institution system 205 has the ability to retrieve information from one or more data sources 229 via the data source access engine 227. Data pertaining to the user 105 and/or the user account 165 and/or processing and clearing of a check may be retrieved from data source(s) 229 and/or external data sources. The retrieved data may be stored centrally, perhaps in storage 208. Other information may be provided to the institution system 205 from the user 105 and/or the representative 135.

Data source(s) 229 may contain data, metadata, email, files, and/or documents that the institution system 205 maintains pertaining to the user 105, such as personal data such as name, physical address, email address, etc. and financial data such as credit card numbers and checking account numbers. Such data may be useful for processing the digital image file 115 comprising portions 117 of the check 110 as described herein. Additionally or alternatively, the institution system 205 may access this information when processing or clearing a check.

The representative computing device 137 may provide access to a system which is coupled to the institution system 205. A system may be configured to format and transmit a graphical user interface to the representative 135, and through the graphical user interface provide the representative 135 the ability to interact with information that may be maintained, requested, and/or provided by the institution system 205. As mentioned above, the institution system 205 may provide a unified graphical presentation output. In an implementation, the unified graphical presentation is combined with other materials and transmitted to the representative 135.

A user access system may be implemented as a web server in an implementation. The user access system, through the use of any suitable interactive web technology, provides an interactive experience to the user 105 and/or the representative 135 through which access to check processing and clearing data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein.

Examples of software modules 209 may include modules that may be used in conjunction with receiving and processing a digital image file 115 comprising portions 117 of the check 110, generating an image of the check 110 based on the portions 117, retrieving data from the digital image file 115, generating web page content for display, and receiving instructions from the representative 135 or the user 105, for example. While specific functionality is described herein as occurring with respect to specific modules, the functionality may likewise be performed by more, fewer, or other modules. An example computing device and its components are described in more detail with respect to FIG. 6.

Figure 3:
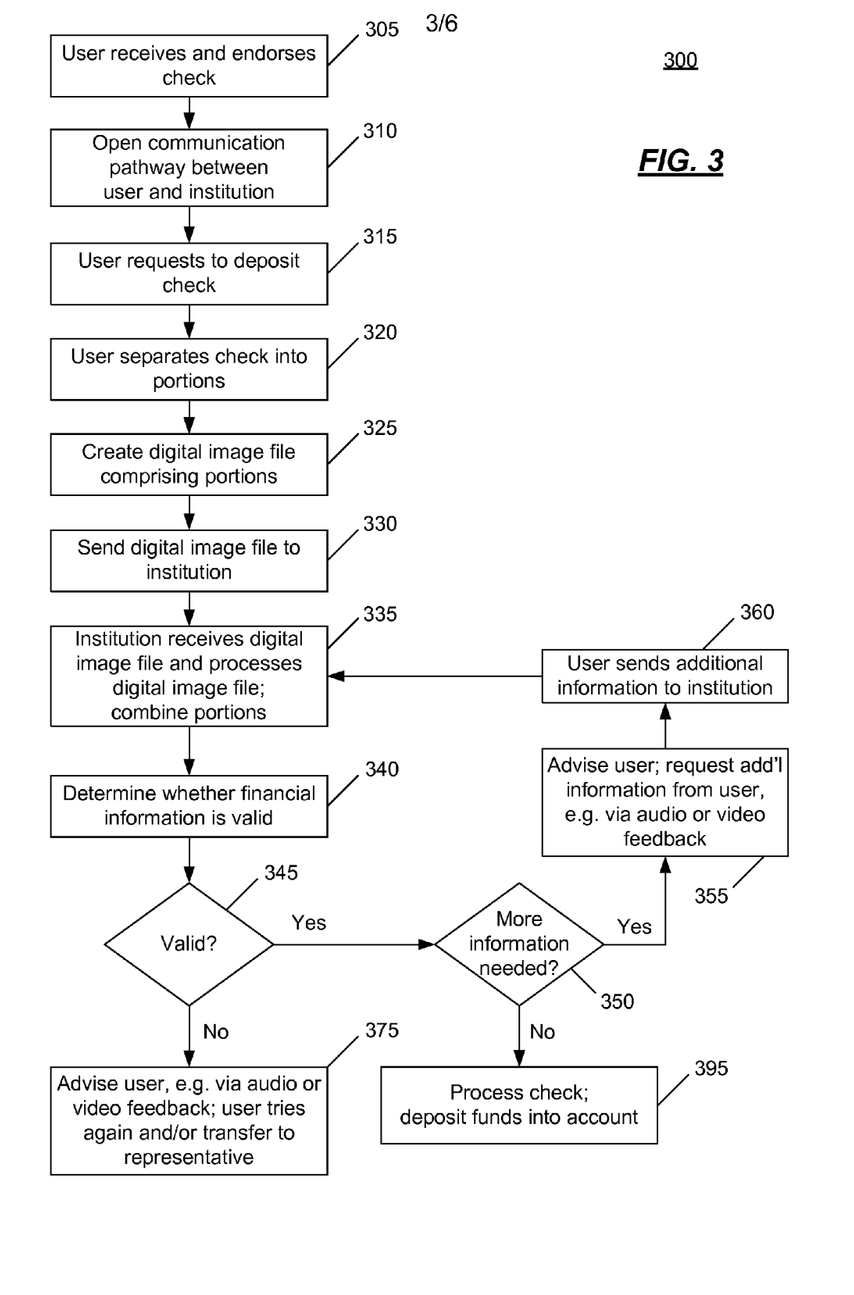
FIG. 3 is an operational flow of an implementation of a method that may be used to deter check re-presentment.

FIG. 3 is an operational flow of an implementation of a method 300 that may be used to deter check re-presentment. At 305, an account owner (i.e., the payee, referred to herein as a user) may receive a check from a third party (i.e., the payor) and may endorse the check by signing the back of the check in the designated field. If the user wishes to deposit the check into an account, such as a savings and/or checking account, they also may write an account number below the signature.

At 310, the user may open a communication pathway with an institution that may be associated with an account for depositing funds by logging into a website of the institution, for example. There may be several ways in which a communication pathway may be established, including, but not limited to, an Internet connection via a website of the institution. The user may access the website and log into the website using credentials, such as, but not limited to, a username and a password.

At 315, the user may send a request to deposit the check and may select an account in which to deposit the check. In an implementation, the user may select a "deposit check" option provided on the website, and may enter details such as check amount, date, the account the check funds should be deposited in, comments, etc.

At 320, the user may separate the check into two or more portions, e.g., by cutting or tearing the check. In an implementation, the institution may provide the user with instructions regarding the separation of the check, such as where to cut or tear the check (e.g., along the longitudinal axis, so as to avoid or not affect the MICR number, etc.). In an implementation, the check may comprise a pre-printed line as a guide along which the user may cut or tear the check.

At 325, a digital image file of the portions of the check may be created. There may be several ways in which to create a digital image file of the portions of the check, including, but not limited to, a scanner, a digital camera, and/or a personal computer (PC). In an implementation, the user may scan or otherwise create a digital image file comprising the front side of each of the portions of the check and the back side of each of the portions of the check.

In an implementation, the user may use a template (e.g., provided by the institution) to arrange the portions of the check for scanning. In this manner, the image of the portions in the digital image file may comprise the portions in a predetermined position or arrangement that may be easier for the institution to identify and/or process.

Alternatively, the user may insert the portions of the check into a holder (e.g., provided by the institution). The portions may be inserted in the holder in a predetermined position or manner. For example, the portions of the check or features of the portions of the check such as one or more corners of the check, the signature line, the MICR line, etc., may be aligned with respect to one or more markings or indicators on the holder. It is contemplated that different holders may be used for the front side portions of the check and for the back side portions of the check. The positioning or alignment may allow for more efficient processing of the check by the institution.

The digital image file may be sent to the institution for processing at 330. The digital image file may be sent using various means, including, but not limited to, an Internet connection via the website or a cellular transmission. Additionally, the digital image file may be augmented by secondary data which may be information relating to the check, such as an account number, a deposit amount, or a routing number associated with the check, and/or relating to the account for depositing funds, such as the account number and/or the name on the account. The secondary data may be provided to the institution via an image file, an email, a facsimile, instant message, text message, or selection via a website associated with the institution (e.g., after the user opens a communication pathway with the institution, before or after the user sends the digital image file of the portions of the check or other negotiable instrument to the institution, etc.), for example.

At 335, the institution may receive the digital image file of the portions of the endorsed check (along with financial information pertaining to the account for depositing funds and any secondary data in an implementation) and may process the digital image file. Processing of the digital image file may include retrieving the portions of the check, combining the portions to generate an image of the check to be deposited, and/or retrieving financial information regarding the check. Any known image processing technology may be used, such as edge detection, filtering to remove imagery except the portions of the check in the received digital image file, image sharpening, and technologies to distinguish between the front and the back sides of the check. The institution may identify and/or remove at least a portion of data that is extraneous to the check, such as background and/or holder data. The holder, or markings or indicators on the holder, may be used in the identification of data that is extraneous to the check and which may be removed by the institution.

In an implementation, the institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the institution, which may process the deposit request, the secondary data if any, and the selected account.

At 340, the institution may determine whether the financial information received from the digital image file may be readable and valid. Retrieved information may include the amount payable to the user, the account associated with the user to deposit funds, an account associated with a payor to debit funds, and an institution associated with the payor and/or the user. For example, the institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the institution to credit an account associated with the user and debit an account associated with the payor. In an implementation, the institution may check that that the resolution of the image meets at least a predetermined threshold, such as 200 dots per inch (dpi), 400 dpi, 500 dpi, etc.

In an implementation, after retrieving the financial information from the check in an electronic data representation form, the institution may determine whether the financial information such as the amount payable to the user, the account associated with the user to deposit funds, an account associated with a payor to debit funds, and an institution associated with the payor, etc. may be valid.

At 345, if the financial information is determined to be valid, it may be determined at 350 if more information is needed from the user before depositing the check. Such information may include data from another side of the check (e.g., the back of the check, the front of the check, or some other information). If no additional information is needed at 350, the electronic data representation may be processed by the institution at 395, thereby depositing the check in the user's account. The user may receive a notice via email, facsimile, instant message or mail, for example, that the check has been deposited into the appropriate account selected by the user.

In an implementation, at 395, the institution may process the electronic data representation of the check. For example, the institution may credit the funds to an account associated with the user if the financial information is valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the user's bank. The payor's bank may then debit the payor's account.

If more information is needed from the user before depositing the check as determined at 350, the user may be advised at 355 and additional information may be requested from the user. The user may be advised by an email, a web message, an instant message, a text message, or the like transmitted from the institution to the user. In an implementation, audio or video feedback may be provided to the user providing status information and/or requesting additional information. The user may send the requested additional information at 360. In an implementation, processing may continue at 335.

If the financial information is determined to be invalid at 345, then the user may be advised at 375. For example, the institution may transmit an email, a web message, an instant message, a text message, or the like to the user indicating that the financial information associated with the electronic data representation may be invalid. In an implementation, audio or video feedback may be provided to the user about image quality and may direct the user on what they may do to provide a good image of the portions of the check or other negotiable instrument for deposit.

The user may determine how to proceed by selecting an option on the message, replying to the email, or the like. In an implementation, if the financial information is held to be invalid, instructions on how the user would like to proceed may be requested from the user, such as whether the user would like to try the electronic deposit again or whether the user would like assistance from a representative, for example. The institution may also provide additional options to the user on how to redeem the check such as mailing the check to the institution or the like. The user may indicate how they would like to proceed. Thus, in an implementation, the user may try generating a digital image file of portions of the check again and sending it to the institution again (e.g., processing may continue at 330) and/or may be transferred to a representative of the institution for assistance.

If the user would like assistance, the financial information may be transferred to a representative for further review. The representative, such as a customer service representative, a bank teller that may be located at a branch, a virtual bank teller that may be located remotely via an electronic device, or the like, may review the financial information associated with the electronic data representation to determine whether to allow the electronic data representation to be processed by the institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the institution, thereby depositing the check in the user's account.

In an implementation, the institution may receive a decision from a representative on whether to credit the funds to an account. For example, a representative such as a virtual teller may make a decision such as to approve or deny processing of the electronic data representation. According to an embodiment, a virtual teller may fill in invalid financial information. For example, the virtual teller may issue a decision to approve the electronic data representation and may fill in the financial information deemed invalid from the initial analysis based upon inspection or review by the teller. The institution may then receive the invalid information from the virtual bank teller such that the electronic data representation may be processed.

Figure 4:
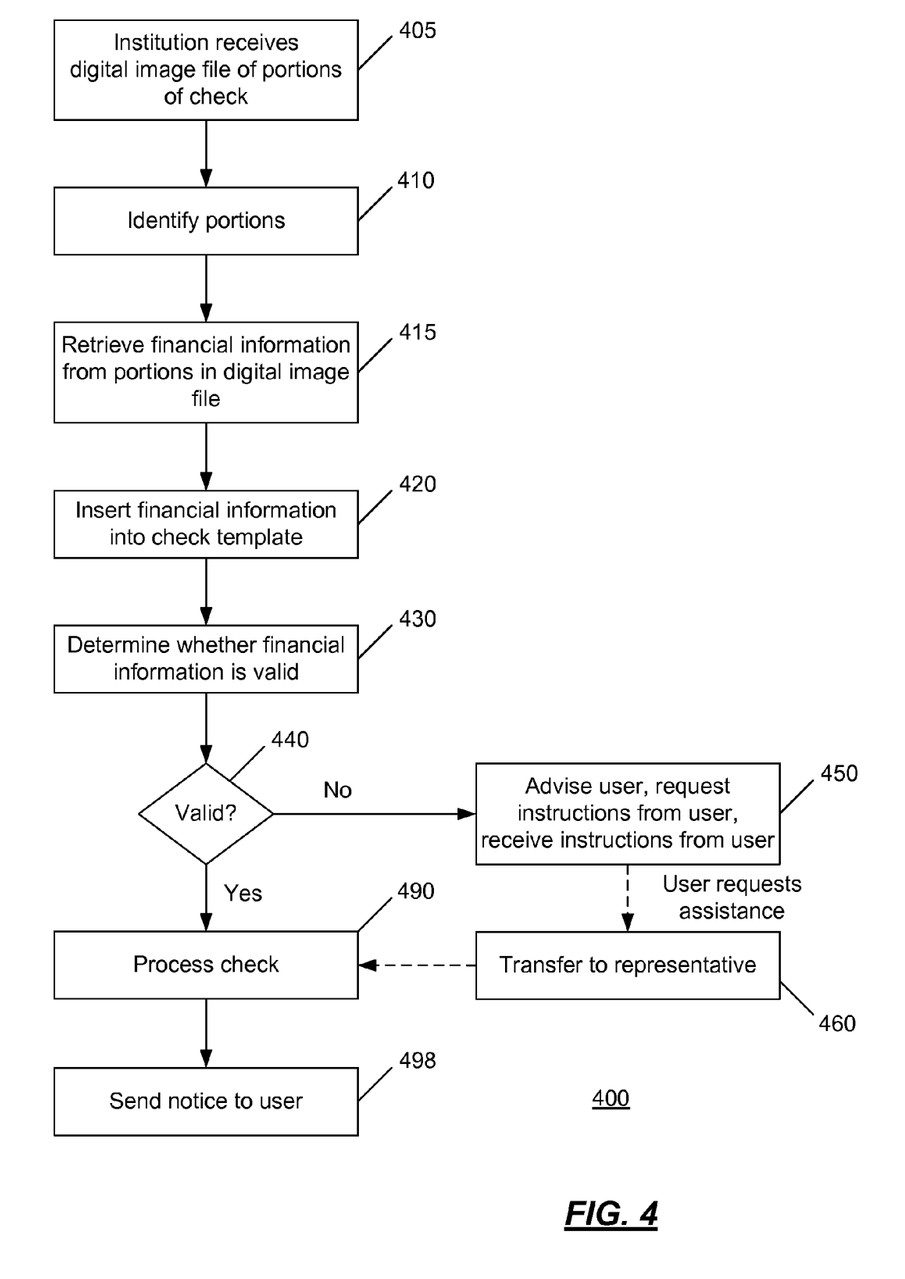
FIG. 4 is an operational flow of another implementation of a method that may be used to deter check re-presentment.

FIG. 4 is an operational flow of another implementation of a method 400 that may be used to deter check re-presentment. At 405, the institution may receive a digital image file, comprising one or more digital images of portions of a check, from a user who may have one or more accounts held by the institution. In an implementation, the digital image file may be received by email, via a website, or via a cellular transmission.

The institution may open the digital image file and process the digital image(s) using any known technology. In an implementation, at 410, the institution may identify the portions and, without combining the portions, at 415, may retrieve financial information from the portions. The financial information may comprise the MICR number, the routing number, an amount, etc.

At 420, the retrieved financial information may be inserted into a check template by the institution for subsequent processing. It is noted that the insertion of the retrieved financial information into a check template is optional and may or may not be used, depending on the processing implementation used.

At 430, after retrieving the financial information from the check in an electronic data representation form, the institution may determine whether the financial information such as the amount payable to the user, the account associated with the user to deposit funds, etc., may be valid. For example, the institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the institution to credit an account associated with the user.

At 440, if the financial information is determined to be valid, the electronic data representation may be processed by the institution at 490, thereby depositing the money in the user's account.

If the financial information is determined to be invalid at 440, then the user may be advised at 450. For example, the institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the deposit again (e.g., make another digital image file and send it to the institution) or whether the user would like assistance from a representative, for example. The user may indicate how they would like to proceed.

If the user would like assistance, the financial information may be transferred to a representative for further review at 460. The representative may review the financial information associated with the electronic data representation to determine whether to allow the electronic data representation to be processed by the institution. If so, the electronic data representation of the financial information may be processed by the institution at operation 490, thereby depositing the check in the user's account.

At 498, the institution may send a notice to the user via email, facsimile, instant message, or mail, for example, that the check has been deposited into the selected account.

Figure 5:
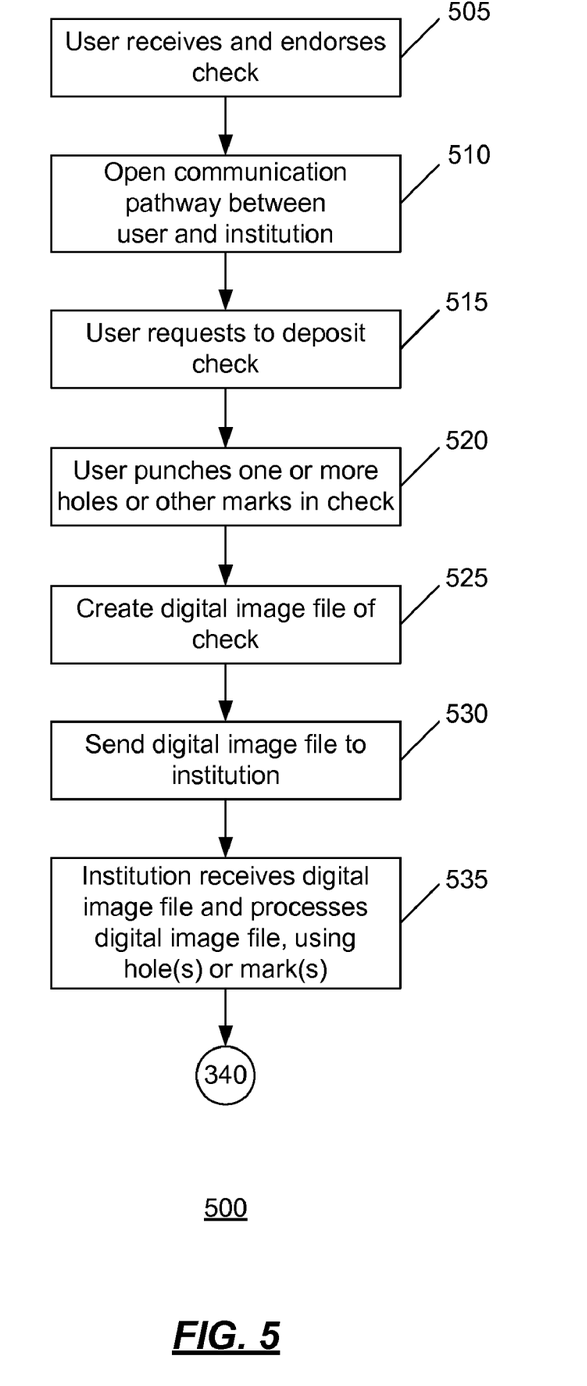
FIG. 5 is an operational flow of another implementation of a method that may be used to deter check re-presentment.

FIG. 5 is an operational flow of another implementation of a method 500 that may be used to deter check re-presentment. Similar to the method 300, the user may receive and endorse a check at 505, open a communication pathway with an institution at 510, and request to deposit the check at 515. These operations are similar to those described at 305, 310, and 315, respectively, and their further descriptions are omitted for brevity.

At 520, the user may punch one or more holes or other marks in the check, e.g., by using a hole punch or other device. In an implementation, the one or more holes or other marks may be made in a predetermined location on the check (e.g., as determined by the user or the institution), an approximate location on the check, or wherever the user chooses on the check. In an implementation, the hole punch or other device may be provided by the institution. For example, the hole(s) or other mark(s) may be made near a feature or point on the check, such as the MICR number, the "$" sign, etc. In an implementation, the check may comprise a pre-printed indicator to guide the user as to where to make the holes(s) or other marks(s).

At 525, a digital image file of the check may be created using a scanner, a digital camera, and/or a PC for example. In an implementation, the user may scan or otherwise create a digital image file comprising the front side and the back side of the check. At 530, similar to 330, the user may send the digital image file to the institution for processing.

At 535, the institution may receive the digital image file of the endorsed check (along with financial information pertaining to the account for depositing funds and any secondary data in an implementation) and may process the digital image file. Processing of the digital image file may include identifying the one or more holes or other marks of the check and retrieving financial information regarding the check. In an implementation, the hole(s) or mark(s) may be used to align the check and/or locate certain financial information on the check. For example, if the user places a hole at each of three corners of the check, such information may be used to locate the fourth corner of the check. As another example, if the user places a hole at the "$" sign, the image processor may use this information in determining the position of the MICR number. Any known image processing technology may be used, such as edge detection, filtering to remove imagery except the check in the received digital image file, image sharpening, and technologies to distinguish between the front and the back sides of the check. The institution may identify and/or remove at least a portion of data that is extraneous to the check. The hole(s) or mark(s) may be used in the identification of data that is extraneous to the check and which may be removed by the institution.

Processing may continue with the check being processed and deposited using techniques described with respect to the method 300, for example. In an implementation, processing may proceed as described with respect to the method 300, e.g., at 340 with a determination of whether the financial information from the check is readable and valid.

Because the check has one or more holes or other marks that have been made by the user, it is more difficult for the user to re-present the check, and the institution may more easily detect a re-presentment. Thus, the user may be deterred from re-presenting the check.

Although the examples described herein may refer to separating a check into portions or making one or more holes or marks in a check prior to electronically presenting the check for deposit, it is contemplated that any negotiable instrument may be processed using the techniques described herein.

Exemplary Computing Arrangement

Figure 6:
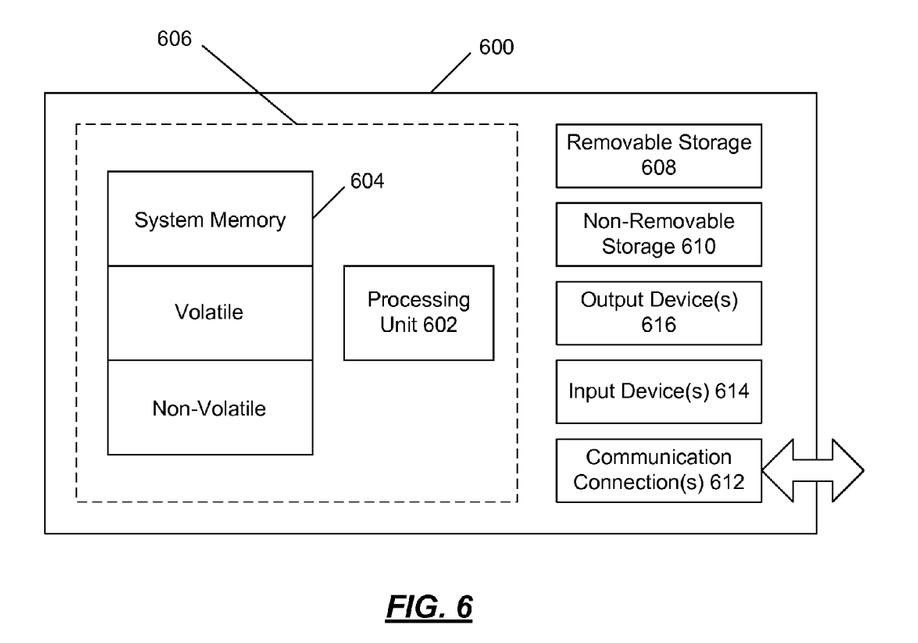
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of deterring check re-presentment, comprising:
   physically separating a check into a plurality of portions;
   electronically providing an image file comprising an image of the plurality of portions of the check to a computing device of an institution via a communications network; and
   receiving a notice that funds of the check have been deposited into an account associated with the institution.

2. The method of claim 1, further comprising:
   creating the image file prior to providing the image file to the institution.

3. The method of claim 2, wherein creating the image file comprises using a scanner or a camera to generate the image of the plurality of portions.

4. The method of claim 3, wherein creating the image file further comprises inserting the plurality of portions into a holder prior to using the scanner or the camera to generate the image of the plurality of portions.

5. The method of claim 1, wherein physically separating the check comprises cutting or tearing the check into the plurality of portions.

6. The method of claim 1, wherein physically separating the check comprises physically separating the check into the plurality of portions so as to avoid a magnetic ink character recognition (MICR) number.

7. The method of claim 1, wherein providing the image file comprises transmitting the image file to the institution via an Internet connection or a cellular connection.

8. A computer-readable medium comprising computer-readable instructions for deterring check re-presentment, said computer-readable instructions comprising instructions that:
   physically separate a check into a plurality of portions;
   electronically provide an image file comprising an image of the plurality of portions of the check to a computing device of an institution via a communications network; and
   receive a notice that funds of the check have been deposited into an account associated with the institution.

9. The computer-readable medium of claim 8, further comprising instructions that:
   create the image file prior to providing the image file to the institution.

10. The computer-readable medium of claim 9, wherein the instructions that create the image file comprise instructions that use a scanner or a camera to generate the image of the plurality of portions.

11. The computer-readable medium of claim 10, wherein the instructions that create the image file further comprise instructions that insert the plurality of portions into a holder prior to using the scanner or the camera to generate the image of the plurality of portions.

12. The computer-readable medium of claim 8, wherein the instructions that physically separate the check comprise instructions that cut or tear the check into the plurality of portions.

13. The computer-readable medium of claim 8, wherein the instructions that physically separate the check comprise instructions that physically separate the check into the plurality of portions so as to avoid a magnetic ink character recognition (MICR) number.

14. The computer-readable medium of claim 8, wherein the instructions that provide the image file comprise instructions that transmit the image file to the institution via an Internet connection or a cellular connection.

15. A system for deterring check re-presentment, comprising:
   at least one subsystem that physically separates a check into a plurality of portions;
   at least one subsystem that electronically provides an image file comprising an image of the plurality of portions of the check to a computing device of an institution via a communications network; and
   at least one subsystem that receives a notice that funds of the check have been deposited into an account associated with the institution.

16. The system of claim 15, further comprising:
   at least one subsystem that creates the image file prior to providing the image file to the institution.

17. The system of claim 16, wherein the at least one subsystem that creates the image file comprises at least one subsystem that uses a scanner or a camera to generate the image of the plurality of portions.

18. The system of claim 17, wherein the at least one subsystem that creates the image file further comprises at least one subsystem that inserts the plurality of portions into a holder prior to using the scanner or the camera to generate the image of the plurality of portions.

19. The system of claim 15, wherein the at least one subsystem that physically separates the check comprises at least one subsystem that cuts or tears the check into the plurality of portions.

20. The system of claim 15, wherein the at least one subsystem that physically separates the check comprises at least one subsystem that physically separates the check into the plurality of portions so as to avoid a magnetic ink character recognition (MICR) number.

21. The system of claim 15, wherein the at least one subsystem that provides the image file comprises at least one subsystem that transmits the image file to the institution via an Internet connection or a cellular connection.

* * * * *